United States Patent
Takahashi et al.

(10) Patent No.: US 12,548,112 B2
(45) Date of Patent: Feb. 10, 2026

(54) RECORDING MEDIUM, DISPLAY DEVICE, DISPLAY SYSTEM AND DISPLAY METHOD THAT DISPLAYS LESION CANDIDATE AREAS OR DISPLAY INFORMATION THEREOF

(71) Applicant: Konica Minolta, Inc., Tokyo (JP)

(72) Inventors: Hidekazu Takahashi, Toyonaka (JP); Hisashi Wada, Tokyo (JP); Ken Satou, Mitaka (JP); Seiji Nomura, Hino (JP); Ryuta Ogawa, Suita (JP)

(73) Assignee: Konica Minolta, Inc., Tokyo (JP)

( * ) Notice: Subject to any disclaimer, the term of this patent is extended or adjusted under 35 U.S.C. 154(b) by 161 days.

(21) Appl. No.: 18/500,536

(22) Filed: Nov. 2, 2023

(65) Prior Publication Data
US 2024/0161231 A1 May 16, 2024

(30) Foreign Application Priority Data
Nov. 16, 2022 (JP) ................ 2022-183009

(51) Int. Cl.
*G06T 3/40* (2024.01)
*G06T 7/00* (2017.01)
*G16H 30/20* (2018.01)

(52) U.S. Cl.
CPC .............. *G06T 3/40* (2013.01); *G06T 7/0012* (2013.01); *G16H 30/20* (2018.01);
(Continued)

(58) Field of Classification Search
CPC .......... G16H 30/20; G16H 30/40; G06T 3/40; G06T 7/0012; G06T 2200/24;
(Continued)

(56) References Cited

U.S. PATENT DOCUMENTS

| 9,773,305 | B2 * | 9/2017 | Lee ................... G06T 7/0012 |
| 2015/0356271 | A1 * | 12/2015 | Kozuka ................. A61B 6/563 |
| | | | 705/2 |
| 2018/0177446 | A1 * | 6/2018 | Okabe .................. G16H 30/20 |

FOREIGN PATENT DOCUMENTS

| JP | 2005-182735 A | 7/2005 |
| JP | 4651353 B2 | 3/2011 |

(Continued)

OTHER PUBLICATIONS

Notice of Reasons for Refusal issued in corresponding Japanese Application No. 2022-183009 mailed Dec. 3, 2024 (12 pages).

*Primary Examiner* — Jacinta M Crawford

(74) *Attorney, Agent, or Firm* — Osha Bergman Watanabe & Burton LLP

(57) ABSTRACT

A non-transitory computer-readable recording medium stores instructions causing a computer to execute: acquiring first information indicating a first lesion candidate area in a medical image, and causing a display to display the medical image attached with first display information that is based on the first information. When causing the display to display the medical image attached with the first display information, in a case that the first lesion candidate area or the first display information is not displayed within an image display area of the display, the computer causes the display to display presence information on the first lesion candidate area or the first display information.

20 Claims, 10 Drawing Sheets

(52) U.S. Cl.
CPC .............................. *G06T 2200/24* (2013.01); *G06T 2207/20092* (2013.01); *G06T 2207/30096* (2013.01); *G06T 2207/30204* (2013.01); *G06T 2207/30242* (2013.01); *G06T 2210/41* (2013.01)

(58) Field of Classification Search
CPC . G06T 2207/20092; G06T 2207/30096; G06T 2207/30204; G06T 2207/30242; G06T 2210/41
USPC ........................................................ 345/667
See application file for complete search history.

(56) References Cited

FOREIGN PATENT DOCUMENTS

| | | |
|---|---|---|
| JP | 2016-192081 A | 11/2016 |
| JP | 2021-29698 A | 3/2021 |
| WO | 2022/024465 A1 | 2/2022 |

\* cited by examiner

| IMAGE ID | PATIENT ID | IMAGING DATA AND TIME | MODALITY | SITE | DIRECTION | ... | ANALYSIS RESULT ID | INTERPRETED IMAGE RESULT ID |
|---|---|---|---|---|---|---|---|---|
| | | | | | | | | |
| | | | | | | | | |
| | | | | | | | | |
| | | | | | | | | |
| | | | | | | | | |

142

RECORDING MEDIUM, DISPLAY DEVICE, DISPLAY SYSTEM AND DISPLAY METHOD THAT DISPLAYS LESION CANDIDATE AREAS OR DISPLAY INFORMATION THEREOF

CROSS-REFERENCE TO RELATED APPLICATIONS

The entire disclosure of Japanese Patent Application No. 2022-183009, filed on Nov. 16, 2022, including description, claims, drawings and abstract is incorporated herein by reference.

BACKGROUND

Technical Field

The present invention relates to a recording medium, a display device, a display system, and a display method.

Description of Related Art

In recent years, a diagnosis support (computer aided detection/diagnosis (CAD) system that analyzes a medical image using a computer and presents a lesion candidate area detected by image analysis to a doctor has been put into practical use.

For example, JP4651353B describes a diagnosis support system in which the lesion candidate area detected by a diagnosis support program (CAD) is marked and displayed on the medical image.

However, when the medical image is enlarged in a system such as that disclosed in JP 4651353B, the lesion candidate area or display information may fall out of an image display area of a screen and may not be displayed on a screen the doctor is viewing. The display information here refers to a mark or an annotation indicating the lesion candidate area. Therefore, the doctor may not notice from the beginning that the lesion candidate area or its display information is displayed outside the image display area of the screen, or may forget to check it, and may overlook a lesion to be viewed.

In particular, in recent years, from the viewpoint of business improvement, cases in which diagnosis is performed by comparing an image analysis result by artificial intelligence (AI) with an interpretation result by the doctor have increased. The above-described situations increase as AI has entered the field of image diagnosis increasingly.

SUMMARY

One or more embodiments of the present invention appropriately generate and present medical image including the lesion candidate area, such that the lesion candidate area or display information thereof in the medical image do not fall out of the image display area of the screen, and thereby enable accurately performing an image analysis. This prevents the doctor from overlooking the lesion to be viewed.

According to an aspect of the present invention, a non-transitory computer-readable recording medium stores instructions causing a computer to execute:
acquiring first information indicating a first lesion candidate area in a medical image, and causing a display part (i.e., display) to display the medical image attached with first display information that is based on the first information, wherein
when causing the display part to display the medical image attached with the first display information,
in a case that the first lesion candidate area or the first display information is not displayed within an image display area of the display part,
the computer causes the display part to display information (i.e., presence information on the first lesion candidate area or the first display information) indicating presence of the first lesion candidate area or the first display information.

According to an aspect of the present invention, a display device comprises: a hardware processor that acquires first information indicating a first lesion candidate area in a medical image and causes a display part to display the medical image attached with first display information that is based on the first information, wherein
when causing the display part to display the medical image attached with the first display information,
in a case that the first lesion candidate area or the first display information is not displayed within an image display area of the display part,
the hardware processor causes the display part to display information indicating presence of the first lesion candidate area or the first display information.

According to an aspect of the present invention, a display system comprises: a hardware processor that acquires first information indicating a first lesion candidate area in a medical image and cause a display part to display the medical image attached with first display information that is based on the first information, wherein
when causing the display part to display the medical image attached with the first display information,
in a case that the first lesion candidate area or the first display information is not displayed within an image display area of the display part,
the hardware processor causes the display part to display information indicating presence of the first lesion candidate area or the first display information.

According to an aspect of the present invention, a display method includes: acquiring first information indicating a first lesion candidate area in a medical image; and displaying, on a display part, the medical image attached with first display information that is based on the first information, wherein the method further comprising:
when displaying the medical image attached with the first display information on the display part,
in a case that the first lesion candidate area or the first display information is not displayed within an image display area of the display part,
displaying information indicating presence of the first lesion candidate area or the first display information on the display part.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein.

DETAILED DESCRIPTION

Hereinafter, embodiments of the present invention will be described with reference to the drawings. However, the scope of the invention is not limited to the disclosed embodiments.

First Embodiment

[Configuration of Medical Image Display System]

Figure 1:
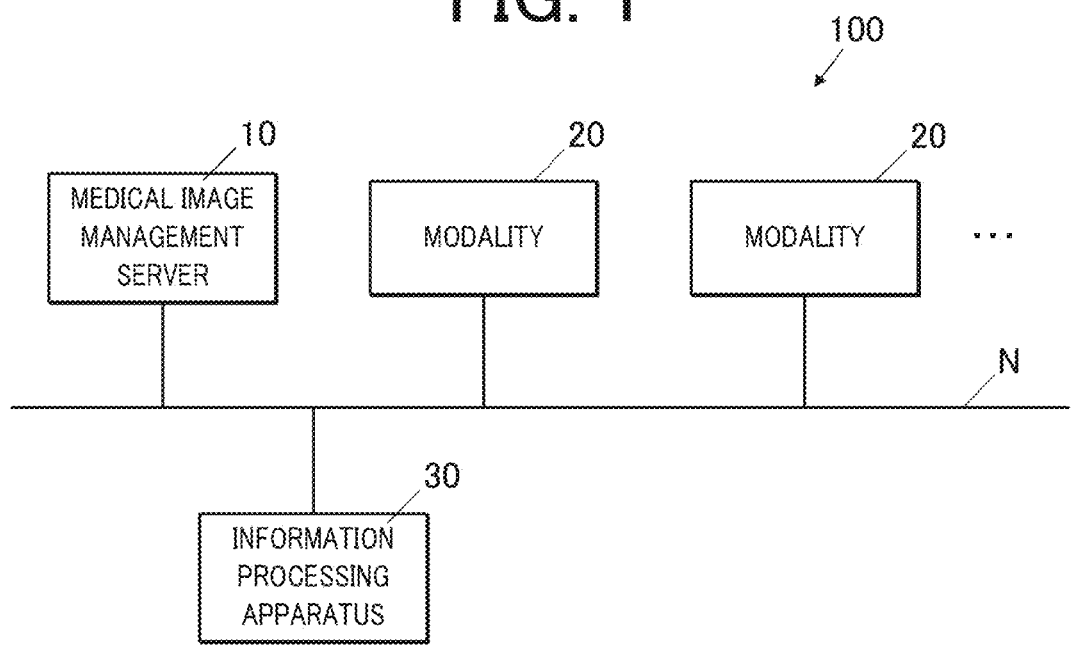
FIG. 1 is a diagram of a system configuration of a medical image display system.

FIG. 1 shows a system configuration of a medical image display system 100 as a display system of the present embodiment.

As illustrated in FIG. 1, the medical image display system 100 includes a medical image management server 10, modalities 20, 20, and, . . . , 20, and an information processing apparatus 30. Each apparatus constituting the medical image display system 100 can perform data communication via a communication network N. The devices constituting the medical image display system 100 conform to Health Level Seven (HL7) or Digital Image and Communications in Medicine (DICOM) standard, and communication between the devices is performed in accordance with HL7 or DICOM. Note that the number of information processing apparatus 30 is not particularly limited.

The modality 20 performs imaging of a patient (subject) and generates image data of a medical image. As the modality 20, for example, computed radiography (CR), digital radiography (DR), computed tomography (CT), magnetic resonance imaging (MRI), ultra sonography (US), nuclear medicine (NM), endoscope (ES), or the like is used.

Furthermore, the modality 20 attaches, to the medical image, image attribute information on the medical image. The image attribute information includes a patient ID, a patient name, a date of birth, a gender, an imaging date and time, an image ID, a modality, a site, a direction, and the like.

The image data of the medical image generated by the modality 20 is transmitted to the medical image management server 10.

The medical image management server 10 stores and manages the image data of the medical image generated by the modality 20. An example of the medical image management server 10 is a Picture Archiving and Communication System (PACS) or the like.

The information processing apparatus 30 is a computer apparatus such as a personal computer (PC) or a tablet computer. The information processing apparatus 30 is a display device that displays the medical image and an analysis result thereof when a user such as a doctor interprets the medical image.

[Configuration of Medical Image Management Server]

Figure 2:
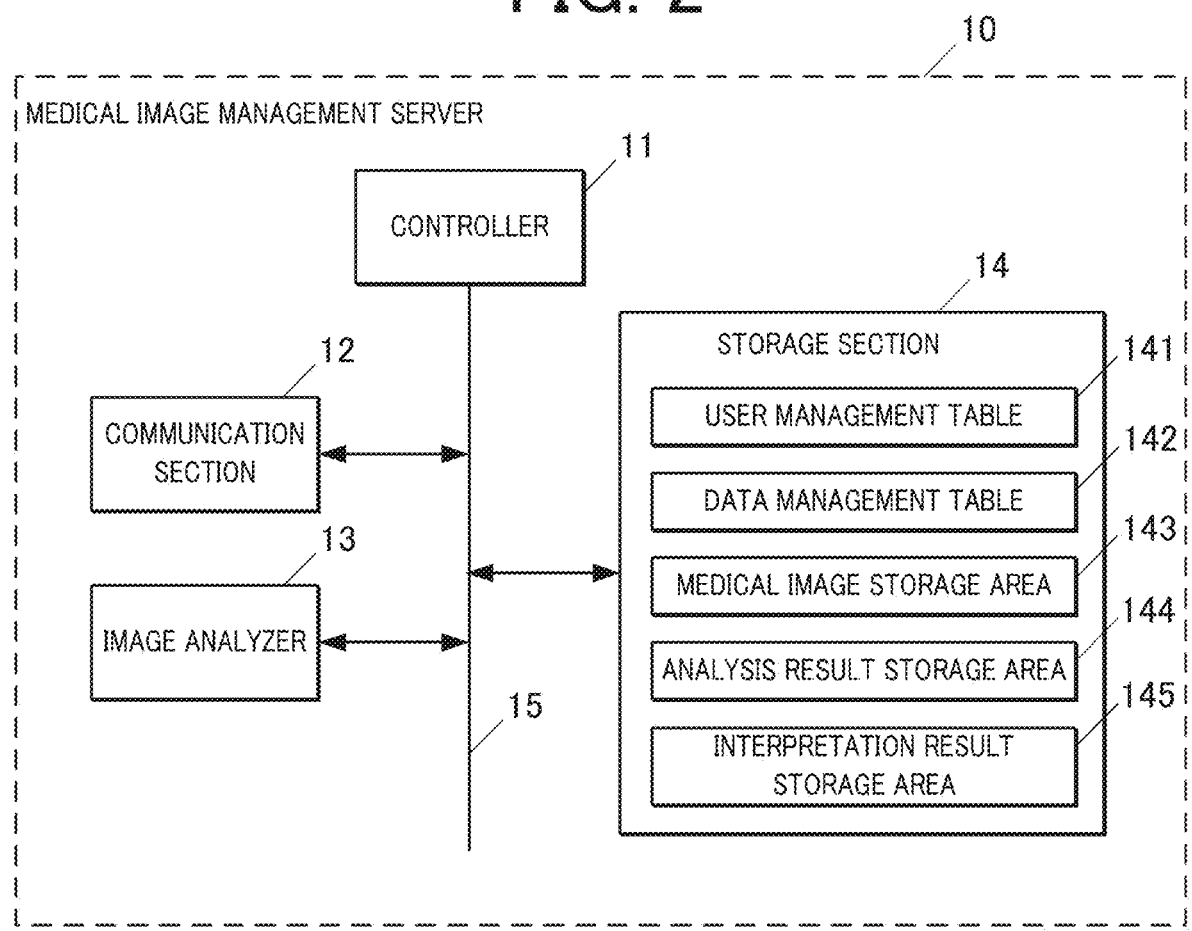
FIG. 2 is a block diagram showing a functional configuration of a medical image management server.

FIG. 2 illustrates a block diagram showing a functional configuration of the medical image management server 10. The medical image management server 10 is configured to include a controller 11, a communication section (or communication interface) 12, an image analyzer 13, a storage section (or storage) 14, and the like, and each section is connected by a bus 15.

The controller 11 is composed of a central processing unit (CPU), a random access memory (RAM), and the like. The CPU of the controller 11 comprehensively controls processing operation of each section of the medical image management server 10. Specifically, the CPU reads various processing programs or instructions stored in the storage section 14, deploys the instructions in the RAM, and performs various processes in cooperation with the instructions.

The communication section 12 includes a network interface and the like. The communication section 12 transmits and receives data to and from an external device connected via the communication network N. For example, the communication section 12 receives the medical image obtained by imaging the patient with the modality 20. Further, the communication section 12 transmits the medical image and the analysis result requested from the information processing apparatus 30 to the information processing apparatus 30.

The image analyzer 13 performs computer processing on the medical image obtained by imaging the patient, and generates data of the analysis result. Here, as the computer processing, image diagnosis/image analysis including detection of a lesion candidate area using, for example, CAD or Artificial Intelligence (AI) is used. The data of the analysis result includes, for example, Grayscale Softcopy Presentation State (GSPS) data of DICOM, overlaid data, and the like. The data of the analysis result includes an analysis result ID for identifying the analysis result, and information on each detected lesion candidate area. The information on each lesion candidate area includes positional information, the type of lesion, and display information (for example, annotation).

The image analyzer 13 is implemented by software processing in cooperation with the instructions stored in the storage section 14 and the CPU of the controller 11.

The storage section 14 is configured of a Hard Disk Drive (HDD), a non-volatile semiconductor memory, or the like. The storage section 14 stores various processing instructions, parameters and files required for execution of the instructions.

Furthermore, the storage section 14 stores a user management table 141 and a data management table 142. The storage section 14 includes a medical image storage area 143, an analysis result storage area 144, and an interpretation result storage area 145.

The user management table 141 is a table for managing users who use the medical image display system 100. The user is, for example, a medical worker such as the doctor. The user management table 141 stores, for each user, a user ID, a password, a name, an affiliation, a mail address, a telephone number, and the like in association with each other.

The user ID is identification information on a user. The password is used for authentication when the user accesses the medical image management server 10 from the information processing apparatus 30. The name is a name of the user. The affiliation is information of a medical facility, a department, or the like to which the user belongs. The mail address is a mail address of the user. The telephone number is a telephone number of the user.

The data management table 142 is a table for managing data in the medical image management server 10.

Figures 3, 4:
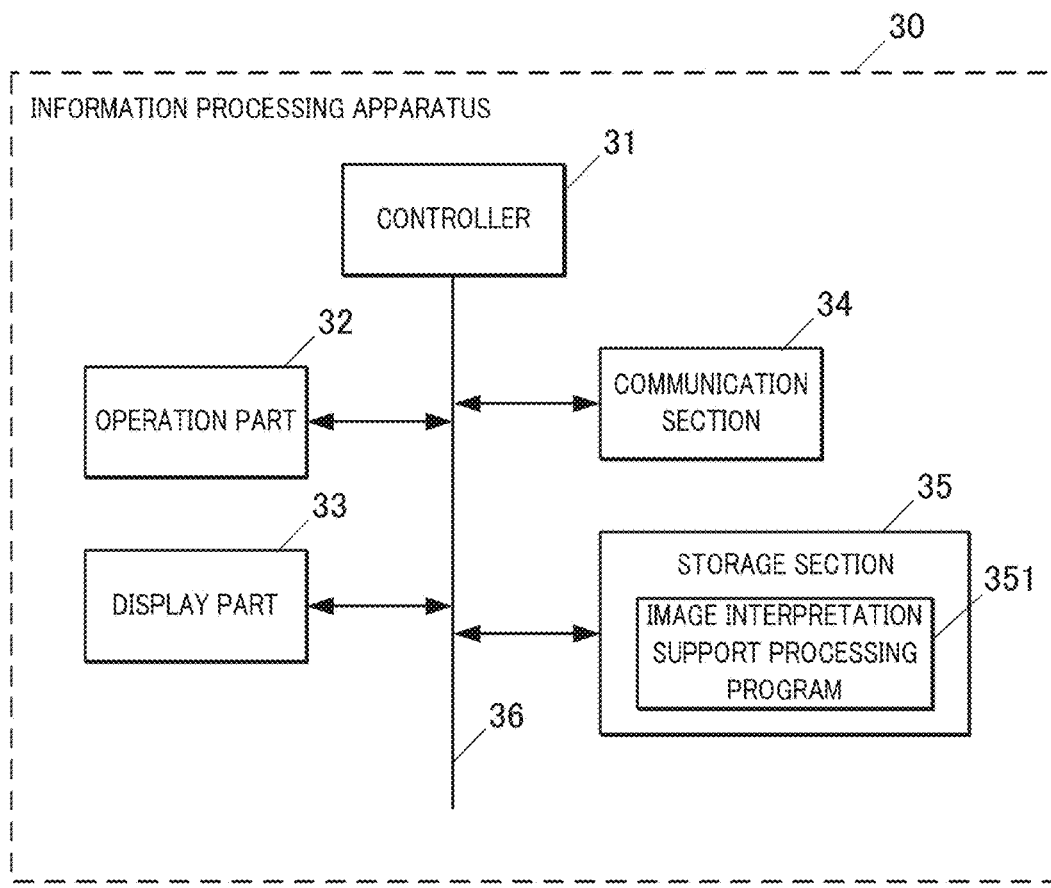
FIG. 3 is a diagram illustrating an example of a data configuration of a data management table.
FIG. 4 is a block diagram showing a functional configuration of an information processing apparatus.

FIG. 3 is a diagram illustrating an example of a data configuration of the data management table 142. The data management table 142 stores, for each medical image stored in the medical image storage area 143, an image ID, a patient ID, an imaging date and time, a modality, a site, a direction, an analysis result ID, an interpreted image result ID, and the like in association with each other.

The image ID is identification information of the medical image. The patient ID is identification information on the patient who is an imaging target of the medical image. The imaging date and time is date and time when the medical image is imaged. The modality is a modality in which the medical image is captured. The site is a site that is an imaging target of the medical image. The direction is an imaging direction of the medical image. The analysis result ID is identification information of the analysis result obtained by analyzing the medical image by the image analyzer 13. The interpreted image result ID is identification information for identifying an interpretation result of the medical image by the user (doctor).

The medical image storage area 143 stores image data of the medical image received from the modality 20.

The analysis result storage area 144 stores data of the analysis result obtained by performing computer processing on the medical image. As described above, the data of the analysis result includes the analysis result ID for identifying the analysis result, and the information on each detected lesion candidate area. The information on the lesion candidate area includes positional information on the lesion candidate area, the type of lesion, and display information (for example, annotation).

The interpreted image result storage area 145 stores data of the interpretation result for the medical image by the doctor (radiologist) who is the user. The interpreted image result includes the interpreted image result ID and the information on the lesion candidate area input by the user.

When the controller 11 receives the medical image from the modality 20 via the communication section 12, the controller 11 causes the storage section 14 to store the medical image and causes the image analyzer 13 to analyze the medical image.

When the controller 11 receives an acquisition request for the medical image and the analysis result thereof from the information processing apparatus 30 via the communication section 12, the controller 11 reads the medical image and the analysis result thereof from the storage section 14 and provides the read medical image and the analysis result to the information processing apparatus 30 via the communication section 12.

[Configuration of Information Processing Apparatus]

FIG. 4 is a block diagram showing a functional configuration of the information processing apparatus 30. The information processing apparatus 30 is configured to include a controller 31, an operation part 32 (or user interface), a display part 33 (or display), a communication section (or communication interface) 34, a storage section (or storage) 35, and the like, and each section is connected by a bus 36.

The controller 31 is composed of a CPU (hardware processor), a RAM and the like, and comprehensively controls processing operation of various sections of the information processing apparatus 30. Specifically, the CPU of the controller 31 reads various processing instructions including the image interpretation support processing program 351 stored in the storage section 35, deploys the processing instructions in the RAM, and performs various processes in cooperation with the deployed instructions.

For example, when the medical image to be interpreted is designated by the operation part 32, the CPU of the controller 31 acquires the designated medical image and first information indicating the first lesion candidate area specified by computer processing on the medical image from the medical image management server 10. Then, the controller 31 causes the display part 33 to display the medical image attached with the first display information that is based on the first information.

Here, the first lesion candidate area is the lesion candidate area among lesion candidate areas obtained by computer processing on the medical image. The first information is positional information of the first lesion candidate area. The first display information is display information such as the annotation attached to the first lesion candidate area of the medical image.

When the controller 31 causes the display part 33 to display the medical image to which the first display information is attached, if the first lesion candidate area or the first display information is not displayed in an image display area 331b of the display part 33, the controller 31 displays information indicating presence of the first lesion candidate area or the first display information on the display part 33.

Figure 6:
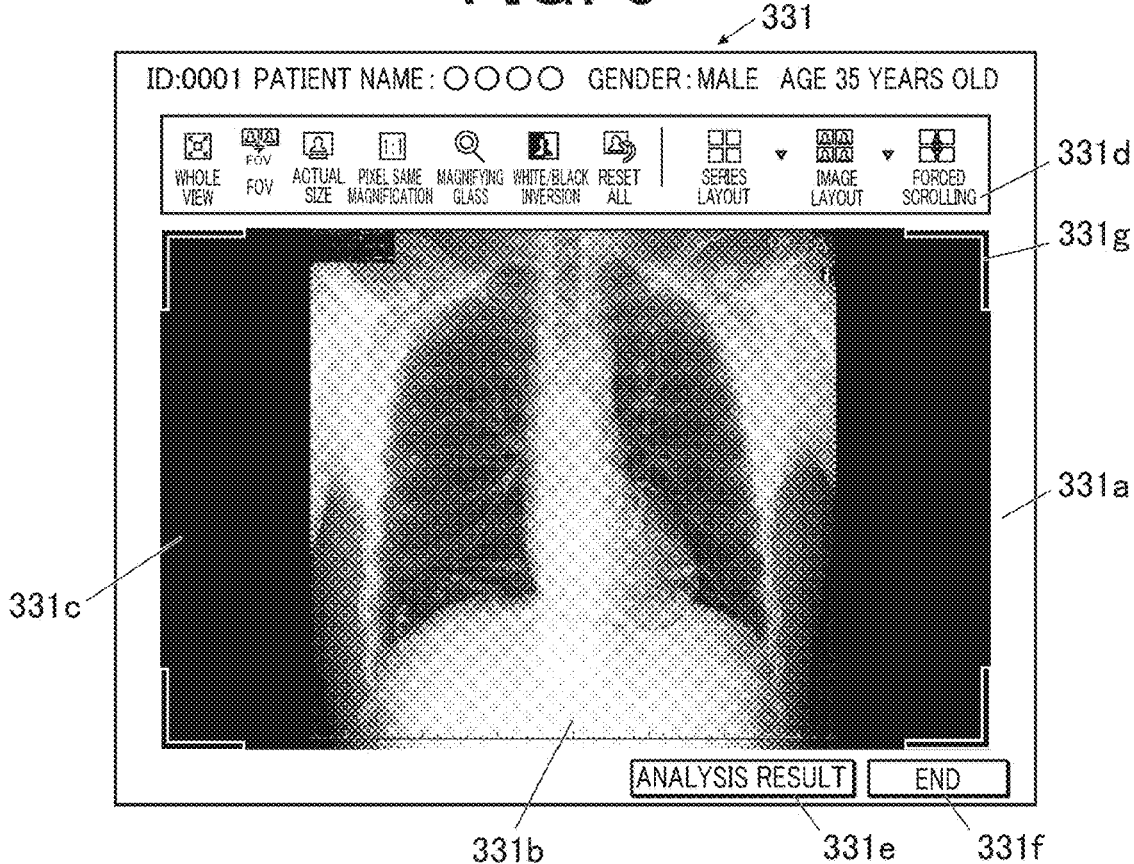
FIG. 6 is a view illustrating an example of an interpreted image screen.

The information indicating the presence of the first lesion candidate area or the first display information includes, for example, information indicating that the first lesion candidate area or the first display information is not displayed in the image display area 331b. The information indicating the presence of the first lesion candidate area or the first display information is displayed in, for example, a display area (screen area) of the display part 33. The display area includes the image display area 331b that is an area for displaying the medical image. The display area includes a window frame 331a, a background display area 331c, and a tool display area 331d, which will be described later (FIG. 6).

The operation part 32 is configured to include a keyboard and a pointing device such as a mouse. The keyboard includes cursor keys, character input keys and number input keys, various function keys, and the like. The pointing device is the mouse or the like. The operation part 32 outputs an operation signal input by a key operation on the keyboard or a mouse operation to the controller 31. In addition, in a case where the operation part 32 is configured by a touch panel laminated on the display part 33, the operation part 32 outputs the operation signal corresponding to a position of a touch operation by a finger or the like of the user to the controller 31.

The display part 33 includes a monitor such as a Liquid Crystal Display (LCD). The display part 33 displays various screens according to an instruction of a display signal input from the controller 31.

The communication section 34 is configured by a network interface or the like. The communication section 34 transmits and receives data to and from an external device connected via the communication network N.

The storage section 35 is configured by an HDD, a non-volatile semiconductor memory, or the like. The storage section 35 stores various processing instructions, parameters and files required for execution of the instructions, and the like. For example, the storage section 35 stores an image interpretation support processing program 351. The image interpretation support processing program 351 includes a program for executing analysis result display processing A (See, FIG. 7) described later.

[Operation in Medical Image Display System]

Next, the operation of the medical image display system 100 will be described.

First, medical image analysis processing performed by the medical image management server 10 will be described.

Figure 5:
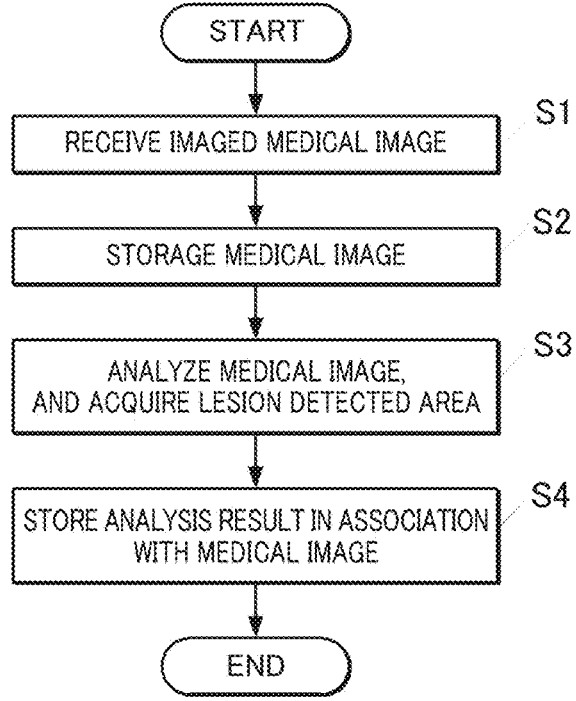
FIG. 5 is a flowchart illustrating medical image analysis processing executed by the medical image management server.

FIG. 5 is a flowchart illustrating medical image analysis processing executed by the medical image management server 10. These processes are implemented by software processing in cooperation between the CPU of the controller 11 and the instructions stored in the storage section 14.

Upon receiving the medical image obtained by imaging the patient from the modality 20 via the communication section 12 (step S1), the controller 11 allows the storage section 14 to store the received medical image in the medical image storage area 143 (step S2). Furthermore, the controller 11 stores, in the data management table 142 (see FIG. 3) in the storage section 14, the image ID, the patient ID, the imaging date and time, the modality, the site, the direction, and the like included in the image attribute information on the received medical image in an associated manner.

Next, the controller 11 causes the image analyzer 13 to analyze the received medical image (step S3). The image analyzer 13 acquires the lesion candidate area by performing computer processing on the medical image by AI or the like, and generates data of the analysis result including information of the acquired lesion candidate area.

Next, the controller 11 causes the storage section 14 to store the analysis result obtained by the image analyzer 13 in association with the medical image (step S4) and ends the medical image analysis processing. Specifically, the controller 11 causes the analysis result storage area 144 of the storage section 14 to store the analysis result. Further, the controller 11 stores the analysis result ID of the analysis result in the record corresponding to the medical image set as the analysis target in the data management table 142 of the storage section 14.

Next, processing executed by the information processing apparatus 30 will be described.

The following processing executed by the controller 31 is implemented by software processing in cooperation between the CPU of the controller 31 and the image interpretation support processing program 351 stored in the storage section 35.

In the information processing apparatus 30, in a case where the image ID or the like of the medical image to be interpreted is designated by the user's operation from the operation part 32, the controller 31 acquires the medical image including the designated image ID and the analysis result of the medical image.

For example, when the image ID or the like of the medical image to be interpreted is specified by a user's operation on the operation part 32, the controller 31 transmits an acquisition request for the medical image including the specified image ID and the analysis result of the medical image to the medical image management server 10 via the communication section 34.

The controller 11 of the medical image management server 10 reads, from the medical image storage area 143, the medical image corresponding to the image ID included in the acquisition request, and transmits the medical image to the information processing apparatus 30 via the communication section 12. Further, the controller 11 refers to the data management table 142 of the storage section 14, and identifies the "analysis result ID" from the record corresponding to the "image ID" of the medical image requested to be acquired. The controller 11 reads the analysis result corresponding to the "analysis result ID" from the analysis result storage area 144, and transmits the analysis result to the information processing apparatus 30 via the communication section 12. In a case where the "interpretation result ID" is stored in the record corresponding to the "image ID" of the medical image requested to be acquired, the controller 11 reads the interpretation result corresponding to the "interpretation result ID" from the interpretation result storage area 145. The controller 11 transmits the interpretation result to the information processing apparatus 30 via the communication section 12.

In the information processing apparatus 30, when the medical image to be interpreted and the analysis result thereof are acquired from the medical image management server 10 via the communication section 34, the controller 31 stores the acquired medical image and analysis result in the storage section 35 or a temporary storage area of the RAM. The medical image stored in the temporary storage area is the medical image to be interpreted. The information on the lesion candidate area included in the analysis result stored in the temporary storage area is the information on the lesion candidate area to be checked by the user.

Next, the controller 31 displays the interpreted image screen 331 on which the acquired medical image is displayed on the display part 33.

FIG. 6 is a view illustrating an example of the interpreted image screen 331. As shown in FIG. 6, the interpreted image screen 331 is provided with a window frame 331*a*, the image display area 331*b*, a background display area 331*c*, the tool display area 331*d*, an analysis result display button 331*e*, an end button 331*f*, and the like.

The window frame 331*a* is a frame of a window having the image display area 331*b*. The image display area 331*b* is an area for displaying a medical image to be interpreted. The background display area 331*c* is a background area that serves as a background for the image display area 331*b*. The tool display area 331*d* is an area in which icons for operation are displayed. The analysis result display button 331*e* is a button for instructing display of display information (annotation) in the lesion candidate area specified by computer processing on the medical image displayed in the image display area 331*b*. The end button 331*f* is a button for giving an instruction to end image interpretation.

When the interpretation result corresponding to the medical image to be interpreted is transmitted from the medical image management server 10, the controller 31 causes the display part 33 to display an interpretation result button (not shown) on the interpreted image screen 331. The interpretation result button is a button for giving an instruction to display the display information (annotation) in the lesion candidate area detected by the image interpretation.

When the medical image in the image display area 331*b* is being operated, the display part 33 displays an active frame 331*g* indicating that the medical image is in use.

In the interpreted image screen 331, the radiologist as the user observes the medical image displayed in the image display area 331*b*. When the lesion candidate area is detected by interpretation of image, the user specifies the lesion candidate area by the operation part 32 and inputs information on the lesion candidate area as the image interpretation result. The information on the lesion candidate area includes positional information on the lesion candidate area, a type of lesion, and display information (annotation).

For example, when the user specifies (for example, right-clicks) the position of an area considered to be the lesion on the medical image displayed in the image display area 331*b* using the operation part 32, the controller 31 displays a menu item including the type of lesion near the designated position. When the type of the lesion in the specified area is selected from among the menu items by operation of the operation part 32, the controller 31 attaches, to the specified area in the medical image, the display information indicating the lesion candidate area detected by the user. Further, the controller 31 temporarily stores the positional information of the lesion detection area, the type of lesion, and the display information (annotation) in the storage section 35 or the RAM as the result of interpretation of image by the user.

Further, the user presses the analysis result display button 331*e* on the interpreted image screen 331 using the operation part 32. Thus, the display information (annotation) of the lesion candidate area specified by computer processing such as AI on the medical image to be interpreted is displayed on the medical image displayed in the image display area 331*b*. The user checks the analysis result based on the display information of the lesion candidate area displayed in the medical image.

If the result of the interpretation of image by the primary radiologist or the like already exists, the user presses the interpretation result button (not shown) by the operation part 32. As a result, the display information (annotation) of the lesion candidate area specified by interpretation of image is displayed on the medical image displayed in the image display area 331*b* The user can also check the interpretation result based on the display information of the lesion candidate area specified by the interpretation of image, which is displayed in the medical image.

Here, in a case where a certain radiologist (for example, the secondary radiologist) interprets the medical image in which the lesion candidate area is detected by another radiologist (for example, the primary radiologist), both are human interpretation. Thus, the viewpoints of the detection of the lesion candidate area are similar to each other, and the likelihood of the radiologist overlooking the lesion candidate area detected by another radiologist is low. Therefore, there has been little needs to check the lesion candidate area detected by another radiologist.

On the other hand, by analysis by computer processing such as AI, the lesion candidate area which is not noticed by the doctor, who is a human, may be detected. Thus, in a case where the radiologist does not check the analysis result, there is a high possibility that the radiologist overlooks the lesion. Therefore, the radiologist needs to be aware of the presence of the annotation indicating the analysis result by the computer processing.

In addition, if there is a case in which oversight is likely to occur in the interpretation of image by the radiologist, it is possible for the image interpretation doctor not only to add the annotation to the lesion candidate area but also to describe a point to which attention should be paid in the image interpretation findings or to give a hand-over. Therefore, even in a case where the lesion candidate area or the annotation thereof detected by the primary radiologist is displayed outside the image display area, overlooking hardly occurs. On the other hand, no hand-over or the like is made in analysis by computer processing such as AI. Therefore, in a case where the lesion candidate area or the annotation thereof is displayed outside the image display area, overlooking tends to occur.

In addition, the annotation added by the computer processing such as AI is not considered for easy visibility when the annotation is added to the medical image, and overlooking by the doctor easily occurs. For example, a situation has occurred in which AI attaches the annotation in a similar color to a white area on the medical image, and even if the annotation moves to the outside of the image display area, it is difficult for the radiologist to recognize the annotation, and thus the annotation tends to be overlooked.

As described above, when the annotation is added to the lesion candidate area specified by computer processing such as AI on the medical image, if the lesion candidate area or the annotation is displayed outside the image display area and the radiologist forgets to check the lesion candidate area or the annotation, oversights may occur.

Figure 7:
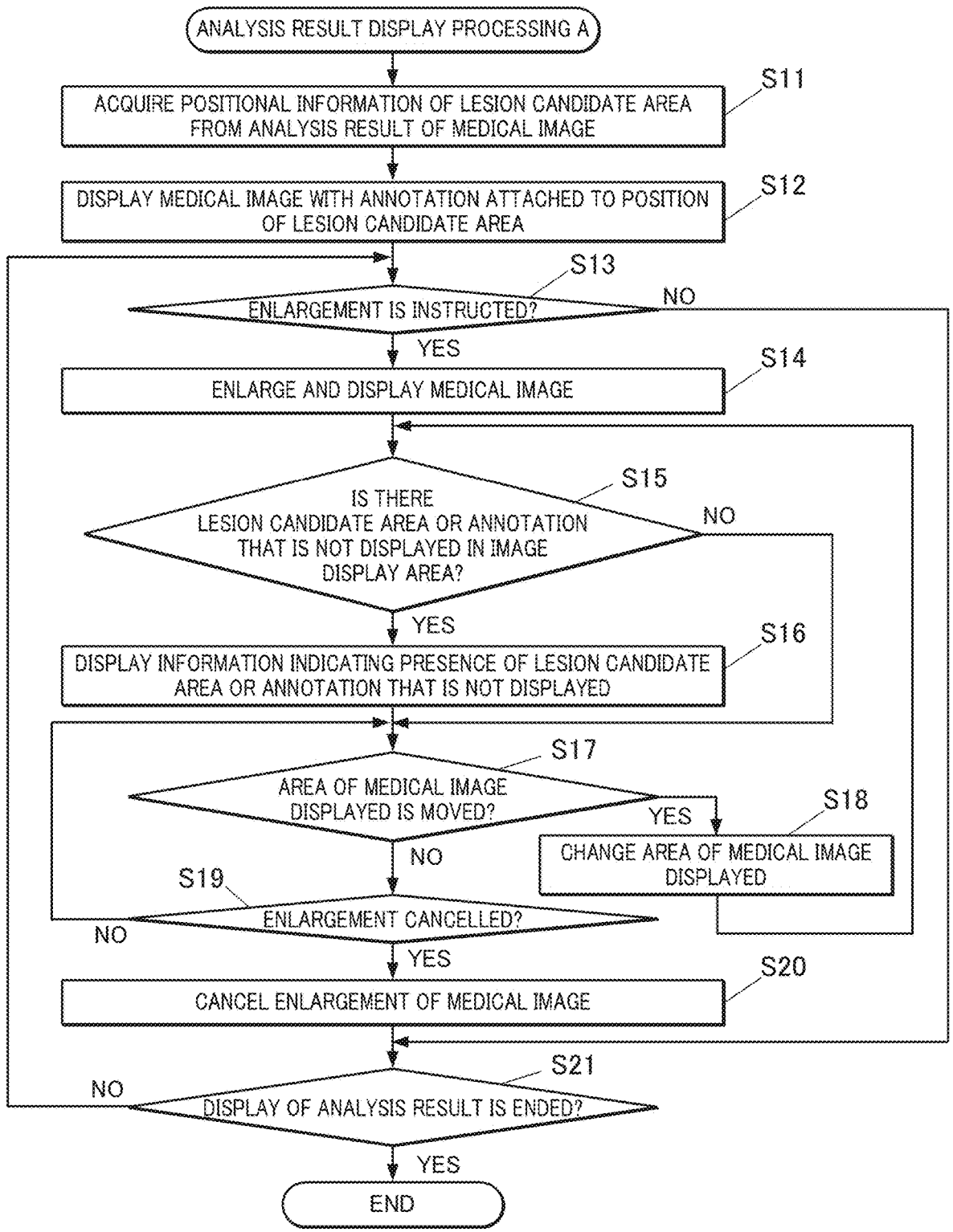
FIG. 7 is a flowchart illustrating a flow of analysis result display processing A executed by a controller of FIG. 4.

Therefore, in the information processing apparatus 30 of the present embodiment, when the analysis result display button 331*e* is pressed by the operation part 32, analysis result display processing A shown in FIG. 7 is executed. Thus, even when the annotation indicating the analysis result is not displayed in the image display area 331*b* due to enlargement, movement, or the like of the medical image displayed in the image display area 331*b* although the analysis result obtained by computer processing is displayed together attached with the medical image, it is possible to prevent the doctor from overlooking the lesion to be viewed.

FIG. 7 is a flowchart illustrating a flow of the analysis result display processing A. This processing is implemented by software processing in cooperation with the CPU of the controller 31 and the image interpretation support processing program 351 stored in the storage section 35.

In the analysis result display processing A, first, the controller 31 acquires, from the analysis result of the medical image displayed in the image display area 331*b*, positional information indicating the position of the lesion candidate area in the medical image (step S11).

Then, the controller 31 causes the entire medical image with the annotation attached to the position of the lesion candidate area on the image display area 331*b* of the interpreted image screen 331 to be displayed based on the acquired positional information (step S12).

Figure 8:
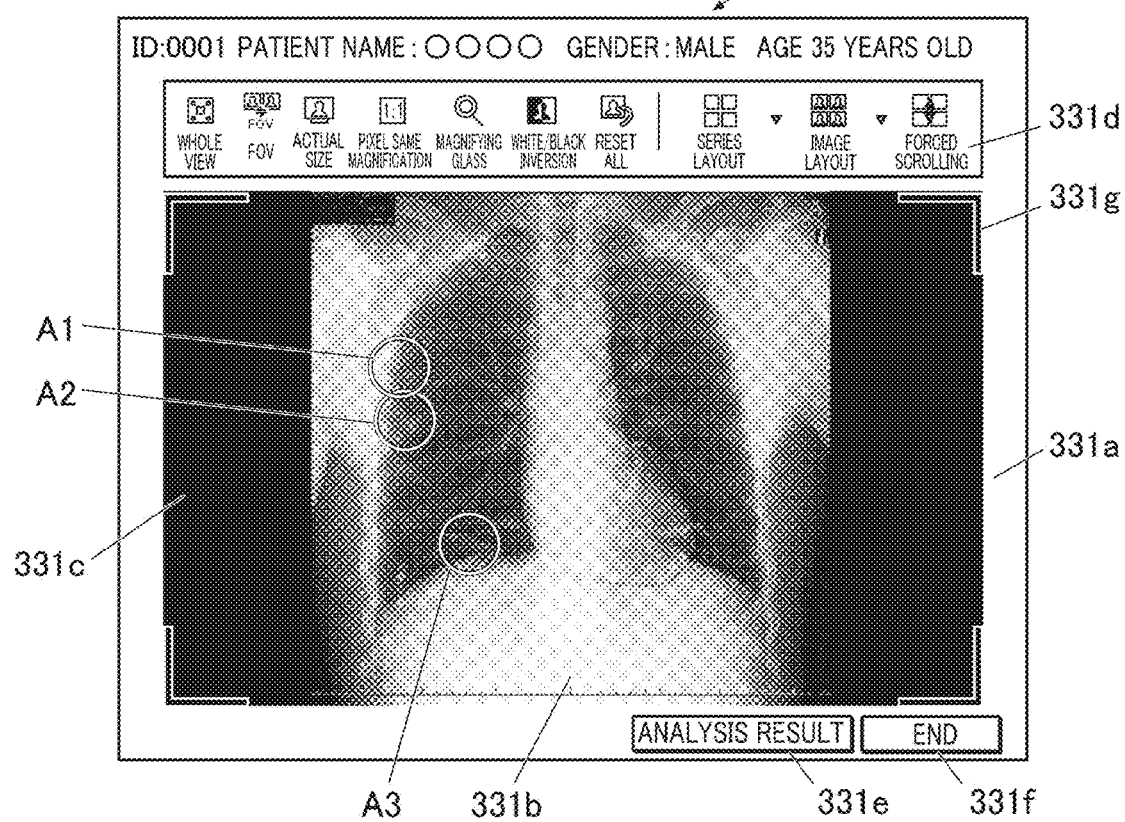
FIG. 8 is a diagram showing an example of an interpreted image screen on which a medical image with annotations attached to positions of lesion candidate areas is displayed in an image display area.

FIG. 8 is a diagram showing an example of the interpreted image screen 331 on which the medical image with the annotations attached to the positions of the lesion candidate area is displayed in the image display area 331*b* in step S12.

On the medical image displayed in the image display area 331b, three lesion candidate areas obtained by computer processing are displayed, and annotations A1, A2, and A3 are attached thereto, respectively.

Next, the controller 31 determines whether or not enlargement of the medical image displayed in the image display area 331b is instructed (step S13).

For example, when the icon of "magnifying glass" in the tool display area 331d is pressed by the operation part 32, the controller 31 determines that the enlargement of the medical image displayed in the image display area 331b is instructed.

When determining that enlargement of the medical image displayed in the image display area 331b is not instructed (step S13; NO), the controller 31 proceeds the process to step S21.

When the controller 31 determines that the enlargement of the medical image displayed in the image display area 331b is instructed (step S13; YES), the controller 31 enlarges and displays the medical image displayed in the image display area 331b (step S14).

Next, the controller 31 determines whether or not there is the lesion candidate area or the annotation that is not displayed in the image display area 331b among the lesion candidate areas or the annotations displayed in step S12 (step S15).

If the controller 31 determines that there is the lesion candidate area or the annotation which is not displayed in the image display area 331b among the lesion candidate areas or the annotations displayed in step S12 (step S15; YES), the controller 31 executes the following process. That is, the controller 31 causes the display part 33 to display information indicating the presence of the lesion candidate area or the annotation which is not displayed in the image display area 331b (step S16), and the process proceeds to step S17.

For example, in a case in which the first lesion candidate area or the first display information (annotation indicating the position of the first lesion candidate area) is not displayed in the image display area 331b, the controller 31 causes the display part 33 to display the information indicating the presence of the first lesion candidate area or the first display information.

In step S16, the controller 31 displays on the display part 33, for example, display information obtained by changing the window frame 331a, as the information indicating the presence of the lesion candidate area or the annotation which is not displayed in the image display area 331b. Alternatively, the controller 31 displays on the display part 33, display information obtained by changing the background display area 331c, as the information indicating the presence of the lesion candidate area or the annotation that is not displayed in the image display area 331b. Alternatively, the controller 31 displays on the display part 33, display information obtained by changing the tool display area 331d, as the information indicating the presence of the lesion candidate area or the annotation not displayed in the image display area 331b.

Figure 9:
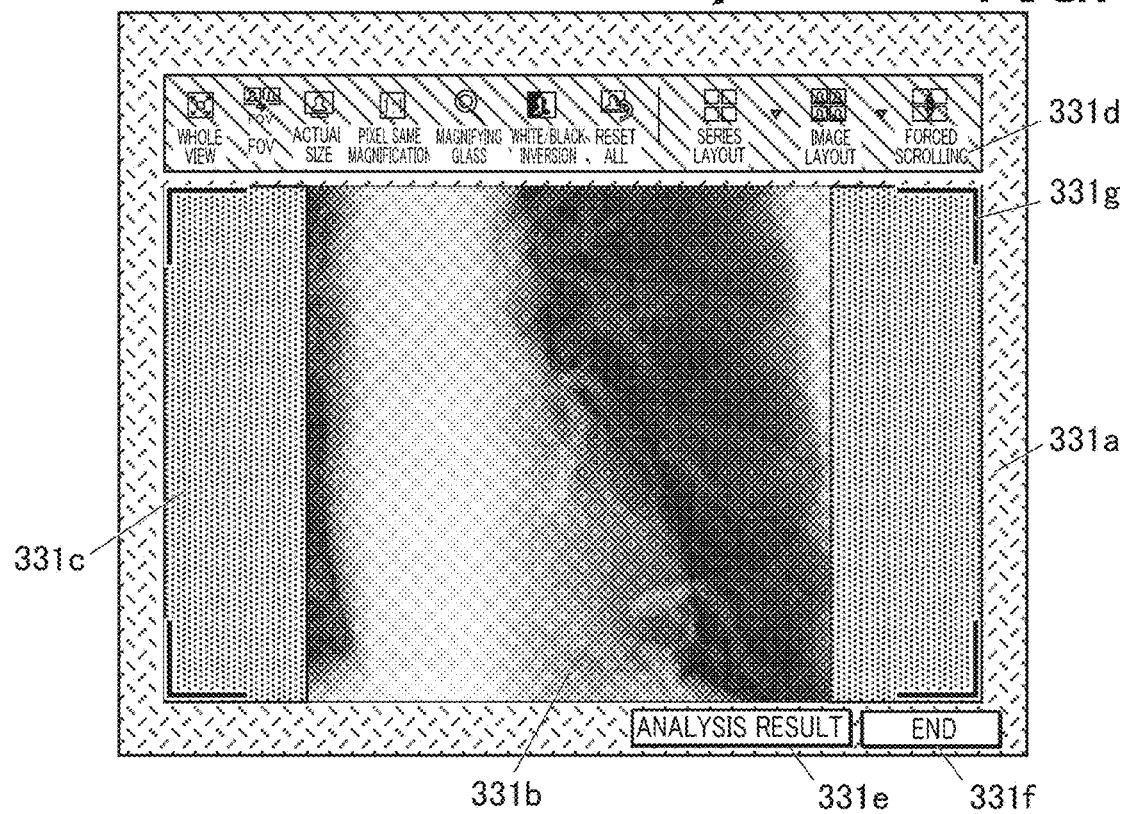
FIG. 9 is a view showing an example of the interpreted image screen on which information indicating presence of the lesion candidate area or an annotation which is not displayed in the image display area is displayed.

For example, as illustrated in FIG. 9, the controller 31 causes the display part 33 to display, as the information indicating the presence of the lesion candidate area or the annotation that is not displayed in the image display area 331b, display information in which the color of the window frame 331a is changed. Alternatively, the controller 31 displays, on the display part 33, display information in which the color of the background display area 331c is changed, as the information indicating the presence of the lesion candidate area or the annotation that is not displayed in the image display area 331b. Alternatively, the controller 31 displays, on the display part 33, display information in which the color of the tool display area 331d is changed, as the information indicating the presence of the lesion candidate area or the annotation that is not displayed in the image display area 331b. In FIG. 9, all the colors of the window frame 331a, the background display area 331c, and the tool display area 331d are changed, but at least one or more colors may be changed.

For example, when the first lesion candidate area or the first display information is not displayed in the image display area 331b, the controller 31 displays the display information in which the window frame 331a (for example, color) is changed on the display part 33, as the information indicating the presence of the first lesion candidate area or the first display information. Alternatively, the controller 31 displays the display information in which the background display area 331c (for example, color) is changed on the display part 33, as the information indicating the presence of the first lesion candidate area or the first display information. Alternatively, the controller 31 displays, on the display part 33, the display information in which the tool display area 331d (for example, color) is changed, as the information indicating the presence of the first lesion candidate area or the first display information.

When the color of the window frame 331a, the background display area 331c, or the tool display area 331d is changed, the controller 31 may change the display color stepwise according to the number of lesion candidate areas or annotations present outside the image display area 331b. For example, when the number of lesion candidate areas or the annotations present outside the image display area 331b is equal to or smaller than a predetermined threshold, the color may be blue, and when the number exceeds the predetermined threshold, the color may be red. Furthermore, the color may be partially changed only in a direction in which the lesion candidate area or the annotation exists outside the image display area 331b. For example, when the lesion candidate area or the annotation is present on the left side of the area displayed in the image display area 331b, only the color of the left side of the window frame 331a, the background display area 331c, or the tool display area 331d may be changed. Accordingly, the user can easily recognize in which direction the lesion candidate area or the annotation not displayed in the image display area 331b is present.

In addition, the controller 31 may display a mark M indicating a direction in which the lesion candidate area or the annotation is present on the display part 33, as the information indicating the presence of the lesion candidate area or the annotation which is not displayed in the image display area 331b.

Figure 10:
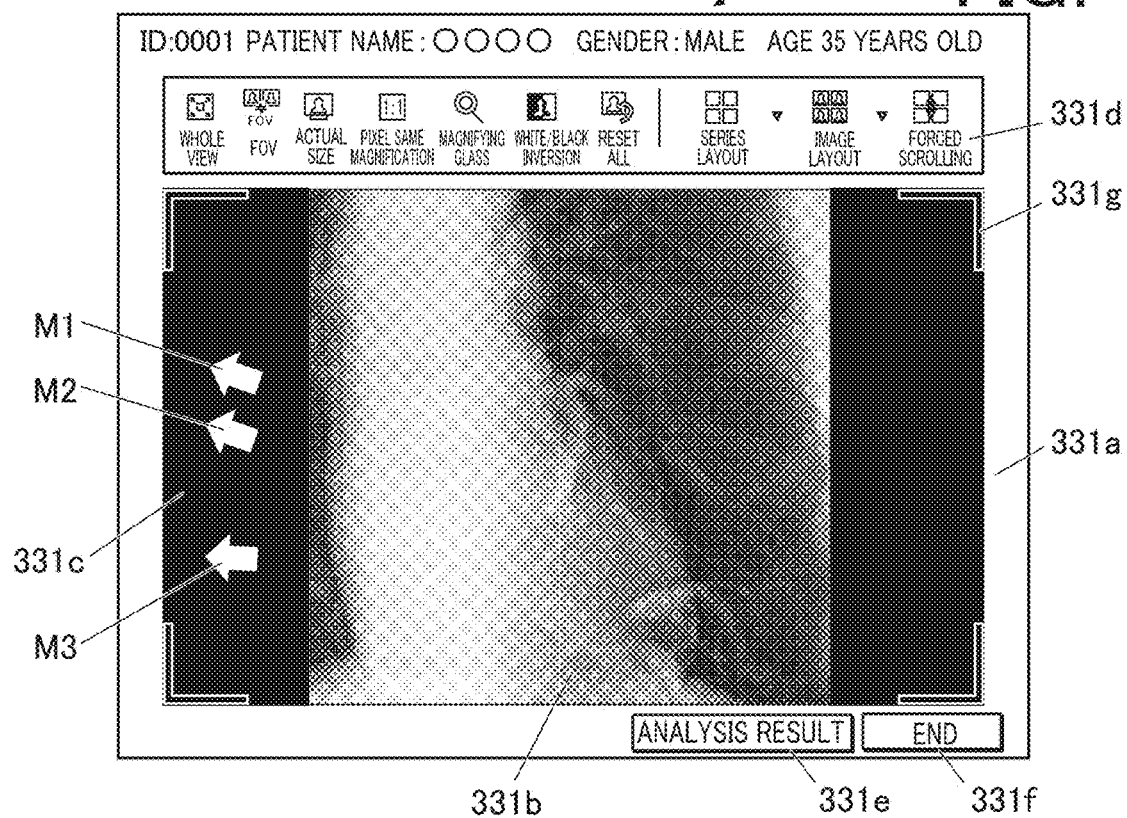
FIG. 10 is a view showing an example of the interpreted image screen on which the information indicating the presence of the lesion candidate area or the annotation which is not displayed in the image display area is displayed.

FIG. 10 shows marks M1 to M3 as examples of the mark M. For example, when the first lesion candidate area or the first display information is not displayed in the image display area 331b, the controller 31 may display the mark M on the display part 33 as the information indicating the presence of the first lesion candidate area or the first display information. Accordingly, the user can easily recognize in which direction the lesion candidate area or the annotation not displayed in the image display area 331b is present.

Figure 11:
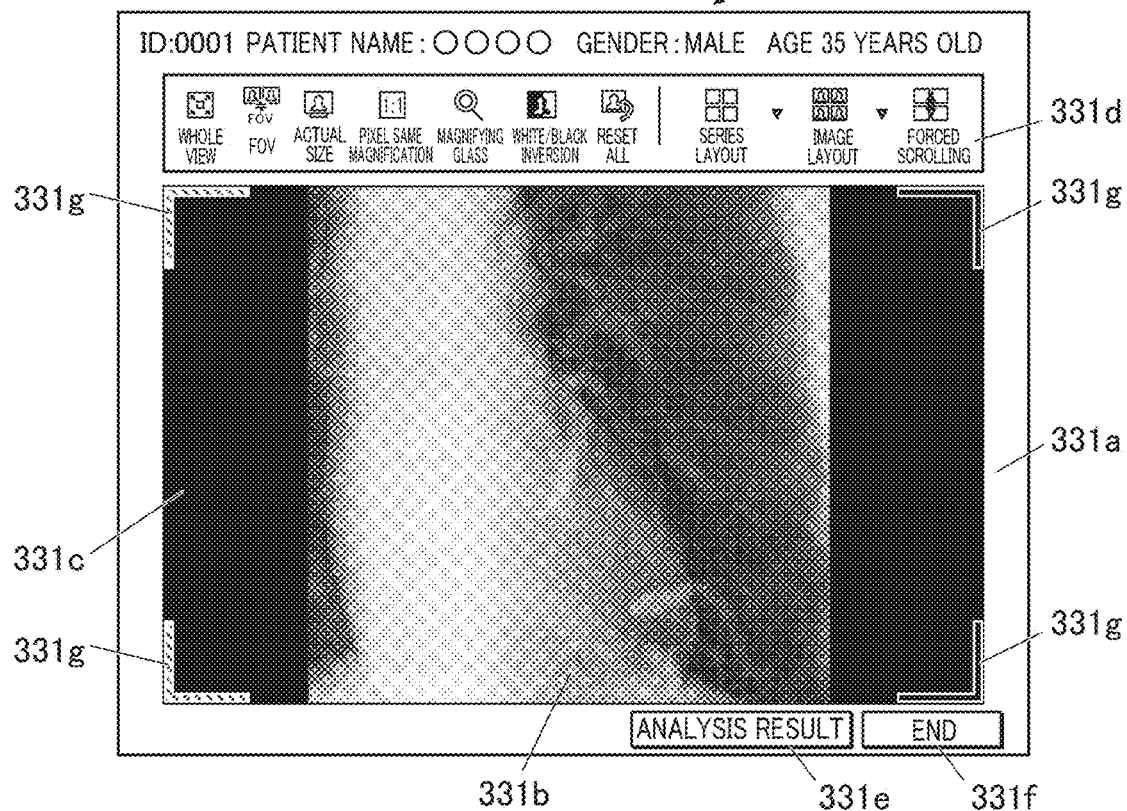
FIG. 11 is a view showing an example of the interpreted image screen on which the information indicating presence of the lesion candidate area or the annotation which is not displayed in the image display area is displayed.

Further, the controller 31 may display, on the display part 33, display information obtained by changing the active frame 331g, for example, as illustrated in FIG. 11, as the information indicating the presence of the lesion candidate area or the annotation that is not displayed in the image display area 331b. For example, the display part 33 may display the display information in which the color of the active frame 331g is changed on the display part 33. When the active frame 331g is changed, a corner may be changed in the direction in which the lesion candidate area or the annotation that is not displayed in the image display area 331b is present among the four corners of the active frame 331g. Accordingly, the user can easily recognize in which direction the lesion candidate area or the annotation not displayed in the image display area 331b is present. In addition, the color to be displayed may be changed in stages according to the number of lesion candidate areas or annotations present outside the image display area 331b.

For example, when the first lesion candidate area or the first display information is not displayed in the image display area 331b, the controller 31 may cause the display part 33 to display information in which the active frame 331g is changed as the information indicating the presence of the first lesion candidate area or the first display information. For example, among the four corners of the active frame 331g, the color of the corner in the direction in which the first lesion candidate area or the first display information is present may be changed.

Figure 12:
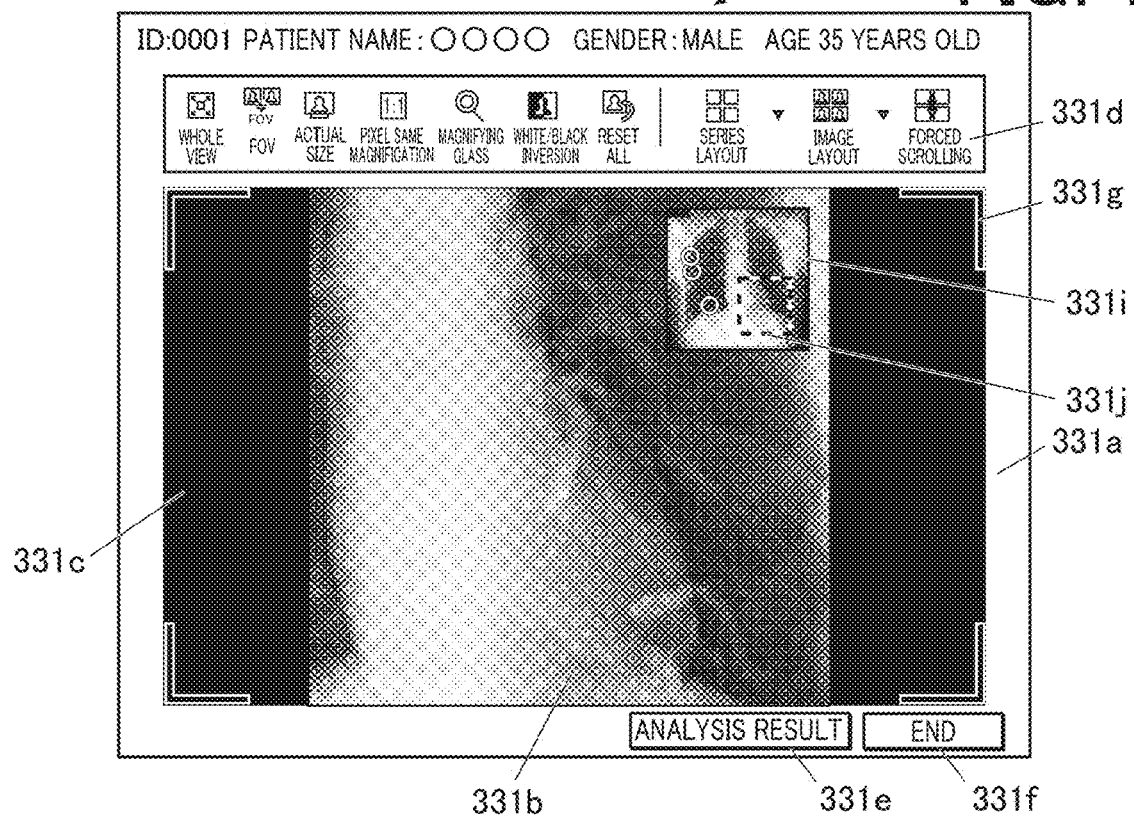
FIG. 12 is a view showing an example of the interpreted image screen on which the information indicating presence of the lesion candidate area or the annotation which is not displayed in the image display area is displayed.

Furthermore, the controller 31 may display, on the display part 33, information (a reduced image 331i in FIG. 12) obtained by reducing the medical image to which the annotation is attached, as the information indicating the presence of the lesion candidate area or the annotation that is not displayed in the image display area 331b. For example, when the first lesion candidate area or the first display information is not displayed in the image display area 331b, information obtained by reducing the medical image to which the first display information is attached may be displayed on the display part 33. Accordingly, the user can easily recognize where the lesion candidate area or the annotation is present in the medical image.

Further, the controller 31 may control the display of the medical image enlarged and displayed in the image display area 331b based on the operation on the reduced image area in which the reduced image 331i is displayed. For example, the controller 31 displays, in the reduced image area, a frame 331j (FIG. 12) indicating the range of an area displayed in an enlarged manner in the image display area 331b in the medical image. In response to the operation of moving the frame 331j, the controller 31 enlarges and displays the area displayed in the frame 331j in the image display area 331b. This makes it possible to efficiently display the lesion candidate area or the annotation to be checked by the user.

Figure 13:
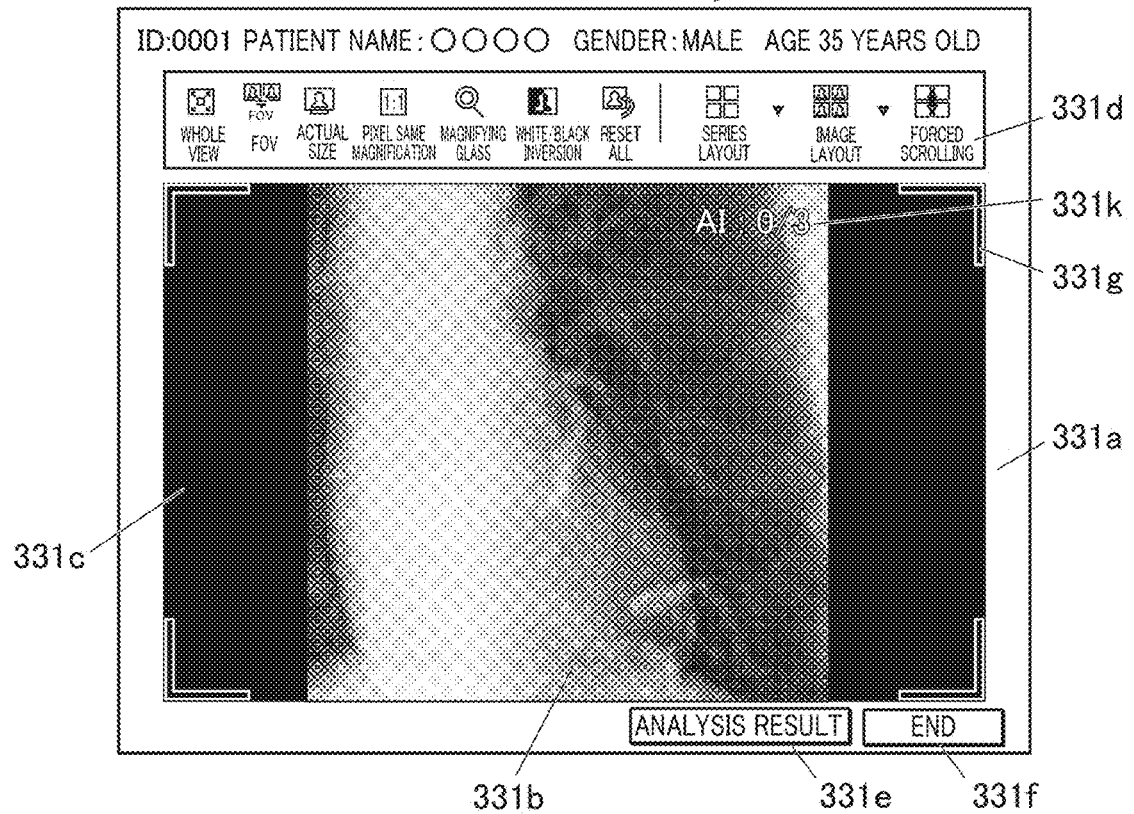
FIG. 13 is a view showing an example of the interpreted image screen on which information indicating presence of the lesion candidate area or the annotation which is not displayed in the image display area is displayed.

As the information indicating the presence of the lesion candidate area or the annotation not displayed in the image display area 331b, the controller 31 may display the number of all lesion candidate areas obtained by computer processing on the displayed medical image and the number of lesion candidate areas displayed in the image display area 331k, for example, as indicated by reference numeral 331k in FIG. 13. Alternatively, as the information indicating the presence of the lesion candidate area or the annotation that is not displayed in the image display area 331b, the number of all lesion candidate areas obtained by computer processing on the displayed medical image and the number of lesion candidate areas that are not displayed in the image display area 331b may be displayed.

On the other hand, when the controller 31 determines in step S15 (FIG. 7) that there is no lesion candidate area or annotation that is not displayed in the image display area 331b (step S15; NO), the controller 31 proceeds the process to step S17.

In step S17, the controller 31 determines whether or not a predetermined operation of moving the area of the medical image to be displayed in the image display area 331b is performed by the operation part 32 (step S17). The predetermined operation is, for example, a movement operation of the frame 331j or a drag operation on the image display area 331b.

When the controller 31 determines that the predetermined operation for moving the area of the medical image to be displayed in the image display area 331b is performed with the operation part 32 (step S17; YES), the controller 31 moves the area of the medical image to be displayed in the image display area 331b in response to the operation (step S18). Then, the controller 31 returns the process to step S15.

When the controller 31 determines that the predetermined operation of moving the area of the medical image displayed in the image display area 331b is not performed by the operation part 32 (step S17; NO), the controller 31 further determines whether or not the cancellation of the enlargement of the medical image is instructed by the operation part 32 (step S19).

For example, when the magnifying glass in the tool display area 331d is pressed again, the controller 31 determines that the cancellation of the enlargement of the medical image is instructed.

When the controller 31 determines that cancellation of the enlargement of the medical image is not instructed (step S19; NO), the controller 31 returns the process to step S17.

When the controller 31 determines that the cancellation of the enlargement of the medical image is instructed (step S19; YES), the controller 31 cancels the enlargement of the medical image and displays the medical image in the image display area 331b (step S20). The process proceeds to step S21.

That is, the controller 31 restores the medical image to the original size and displays the medical image in the image display area 331b.

In Step S21, the controller 31 determines whether or not the end of the display of the analysis result is instructed (Step S21).

For example, when the analysis result display button 331e is pressed again, the controller 31 determines that the end of the display of the analysis result is instructed.

When the controller 31 determines that the end of the display of the analysis result is not instructed (step S21; NO), the controller 31 returns the process to step S13.

When the controller 31 determines that the end of the display of the analysis result is instructed (step S21; YES), the controller 31 ends the analysis result display processing A.

As described above, one or more embodiments of the present invention appropriately generate and present medical image including the lesion candidate area, such that the lesion candidate area or display information thereof in the medical image do not fall out of the image display area of the screen, and thereby enable accurately performing an image analysis. Specifically, when there is the lesion candidate area or the annotation that is not displayed in the image display area 331b of the display part 33 among the lesion candidate areas specified by computer processing on the medical image or the annotations added to the medical image, the controller 31 causes the display part 33 to display information indicating the presence of the lesion candidate area or the annotation which is not displayed in the image display area 331b. Therefore, it is possible to prevent the user from overlooking the lesion to be viewed.

Second Embodiment

A second embodiment of the present invention will be hereinafter explained.

The configuration of the medical image display system 100 according to the second embodiment and the configuration of each device constituting the medical image display system 100 are the same as those described in the first embodiment, and a description thereof will be incorporated. In addition, since the operation of the medical image management server 10 is the same as that described in the first embodiment, the description thereof will be incorporated, and the operation of the information processing apparatus 30 will be described below.

In the second embodiment, for example, the CPU of the controller 31 executes the following operation in cooperation with the image interpretation support processing program 351 stored in the storage section 35.

The controller 31 acquires first information indicating the first lesion candidate area specified by computer processing in the medical image management server 10, and displays the medical image attached with first display information that is based on the first information on the display part 33. Note that the first lesion candidate area, the first information, and the first display information are as described in the first embodiment.

When the controller 31 causes the display part 33 to display the medical image attached with the first display information, if the first lesion candidate area or the first display information is not displayed in the image display area 331b of the display part 33, the controller 31 displays the first lesion candidate area or the first display information on the display part 33 in response to the predetermined instruction input.

In addition, after the controller 31 causes the display part 33 to display the first lesion candidate area or the first display information in response to the predetermined instruction input, the controller 31 switches the first lesion candidate area or the first display information displayed in the image display area 331b of the display part 33 to second display information and causes the display part 33 to display the second lesion candidate area or the second display information. The second lesion candidate area is not displayed in the image display area 331b. The second display information indicates a second lesion candidate area. The second lesion candidate area is a lesion candidate area different from the first lesion candidate area. The second information is positional information of the second lesion candidate area. The second display information is, for example, an annotation indicating the second lesion candidate area.

Figure 14:
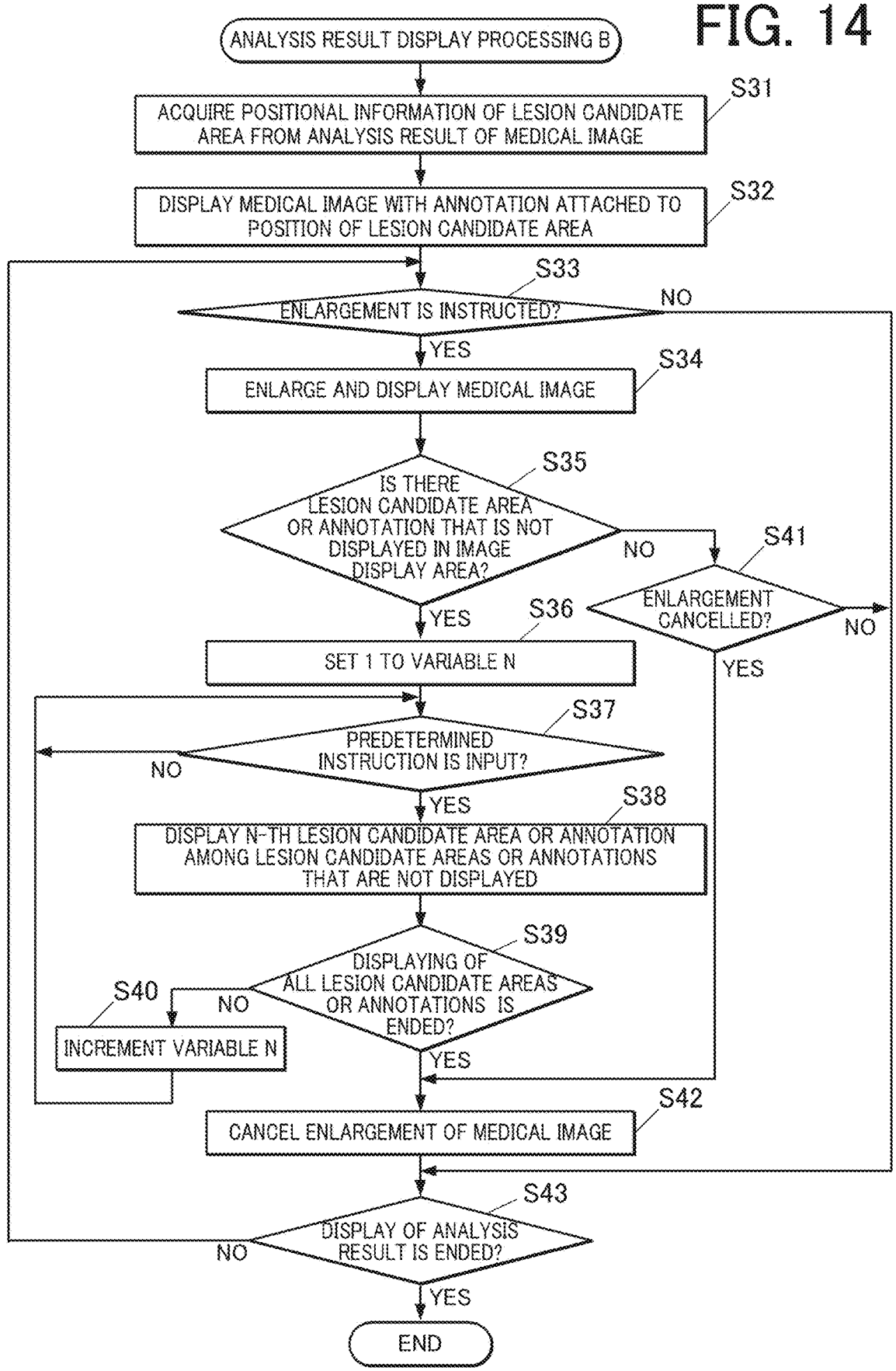
FIG. 14 is a flowchart showing a flow of analysis result display processing B executed by the controller of FIG. 4.

The controller 31 implements the above-described operation according to the second embodiment by, for example, executing analysis result display processing B illustrated in FIG. 14 when the analysis result display button 331e is pressed by the operation part 32 in the interpreted image screen 331 illustrated in FIG. 6. Thus, when the analysis result by computer processing is displayed on the medical image but the annotation indicating the analysis result is not displayed in the image display area 331b due to the enlargement or movement of the medical image, the doctor can be prevented from overlooking the lesion to be viewed.

As described in the first embodiment, when the medical image to be interpreted is designated by the user in the information processing apparatus 30, the controller 31 acquires the medical image to be interpreted and the analysis result thereof from the medical image management server 10 via the communication section 34. The controller 31 stores the acquired medical image and the analysis result in the storage section 35 or the temporary storage area of the RAM (first storage section). The medical image stored in the temporary storage area is the medical image to be interpreted. The information on the lesion candidate area included in the analysis result stored in the temporary storage area is the information on the lesion candidate area to be checked by the user. The controller 31 controls the display of the interpreted image screen 331 and the display of the annotation of the lesion candidate area based on the medical image and the analysis result stored in the temporary storage area.

FIG. 14 is a flowchart illustrating a flow of the analysis result display processing B. This processing is implemented by software processing in cooperation with the CPU of the controller 31 and the image interpretation support processing program 351 stored in the storage section 35. The analysis result display processing B will be described below.

In the analysis result display processing B, first, the controller 31 acquires, from the analysis result of the displayed medical image, positional information indicating the position of the lesion candidate area in the medical image (step S31).

Next, the controller 31 causes the medical image in which the annotation is attached to the position of the lesion candidate area to be displayed in the image display area 331b of the interpreted image screen 331, based on the acquired positional information (step S32).

Next, the controller 31 determines whether or not enlargement of the medical image displayed in the image display area 331b is instructed (step S33).

For example, when the icon of "magnifying glass" in the tool display area 331d is pressed by the operation part 32, the controller 31 determines that the enlargement of the medical image displayed in the image display area 331b is instructed.

When the controller 31 determines that enlargement of the medical image displayed in the image display area 331b is not instructed (step S33; NO), the controller 31 proceeds the process to step S43.

When the controller 31 determines that enlargement of the medical image displayed in the image display area 331b is instructed (step S33; YES), the controller 31 enlarges and displays the medical image displayed in the image display area 331b (step S34).

Next, the controller 31 determines whether or not there is the lesion candidate area or the annotation that is not displayed in the image display area 331b among the lesion candidate areas or the annotations displayed in step S32 (step S35).

When the controller 31 determines that none of the lesion candidate areas and the annotations displayed in step S32 are not displayed in the image display area 331b (step S35; NO), the controller 31 determines whether the instruction to cancel the enlargement of the medical image is given by the operation of the operation part 32 (step S41).

For example, when the magnifying glass in the tool display area 331d is pressed again, the controller 31 determines that the cancellation of the enlargement of the medical image is instructed.

When the controller 31 determines that the cancellation of the enlargement of the medical image is instructed by the operation part 32 (step S41; YES), the controller 31 proceeds the process to step S42.

When the controller 31 determines that the cancellation of the enlargement of the medical image is not instructed by the operation part 32 (step S41; NO), the controller 31 proceeds the process to step S43.

On the other hand, when the controller 31 determines that there is the lesion candidate area or the annotation that is not displayed in the image display area 331b among the lesion candidate areas or the annotations displayed in the step S32 (step S35; YES), the controller 31 sets 1 to a variable n (step S36).

Next, the controller 31 stands by until the predetermined instruction input is performed by the operation part 32 (step S37).

The predetermined instruction input is, for example, pressing of a preset key. The preset key is, for example, a predetermined key such as a right arrow key or an up arrow key.

When the controller 31 determines that the predetermined instruction input is performed (step S37; YES), the controller 31 changes the area of the medical image to be displayed in the image display area 331b and causes an N-th lesion candidate area or the annotation that is not displayed to be displayed (step S38).

For example, the controller 31 changes the area of the medical image to be displayed in the image display area 331b so that the N-th lesion candidate area or the annotation that is not displayed is displayed in the center of the image display area 331b. Since the annotation is attached to the lesion candidate area of the medical image and displayed, both the N-th lesion candidate area and the annotation are generally displayed in step S38.

Then, the controller 31 determines whether or not the display of all the lesion candidate areas or the annotations to be checked by the user is ended (step S39).

When the controller 31 determines that the display of all the lesion candidate areas or the annotations to be confirmed by the user is not completed (step S39; NO), the controller 31 increments the variable n (step S40) and the processing returns to step S37. Then, the controller 31 repeatedly executes the process in steps S37 to S39. The controller 31 changes the area of the medical image displayed in the image display area 331b and switches the lesion candidate area or the annotation to be displayed every time the predetermined instruction input is performed until the display of all the lesion candidate areas or the annotations to be checked by the user is finished.

When the controller 31 determines that display of all the lesion candidate areas or the annotations to be confirmed by the user is completed (step S39; YES), the controller 31 proceeds the process to step S42.

In step S42, the controller 31 cancels the enlargement of the medical image (restores the medical image to its original size) and displays the medical image in the image display area 331b (step S42), and the process proceeds to step S43.

In Step S43, the controller 31 determines whether or not the end of the display of the analysis result is instructed (Step S43).

For example, when the analysis result display button 331e is pressed again, the controller 31 determines that the end of the display of the analysis result is instructed.

When the controller 31 determines that the end of the display of the analysis result is not instructed (step S43; NO), the controller 31 returns the process to step S33.

When the controller 31 determines that the end of the display of the analysis result is instructed (step S43; YES), the controller 31 ends the analysis result display processing B.

Figure 15:
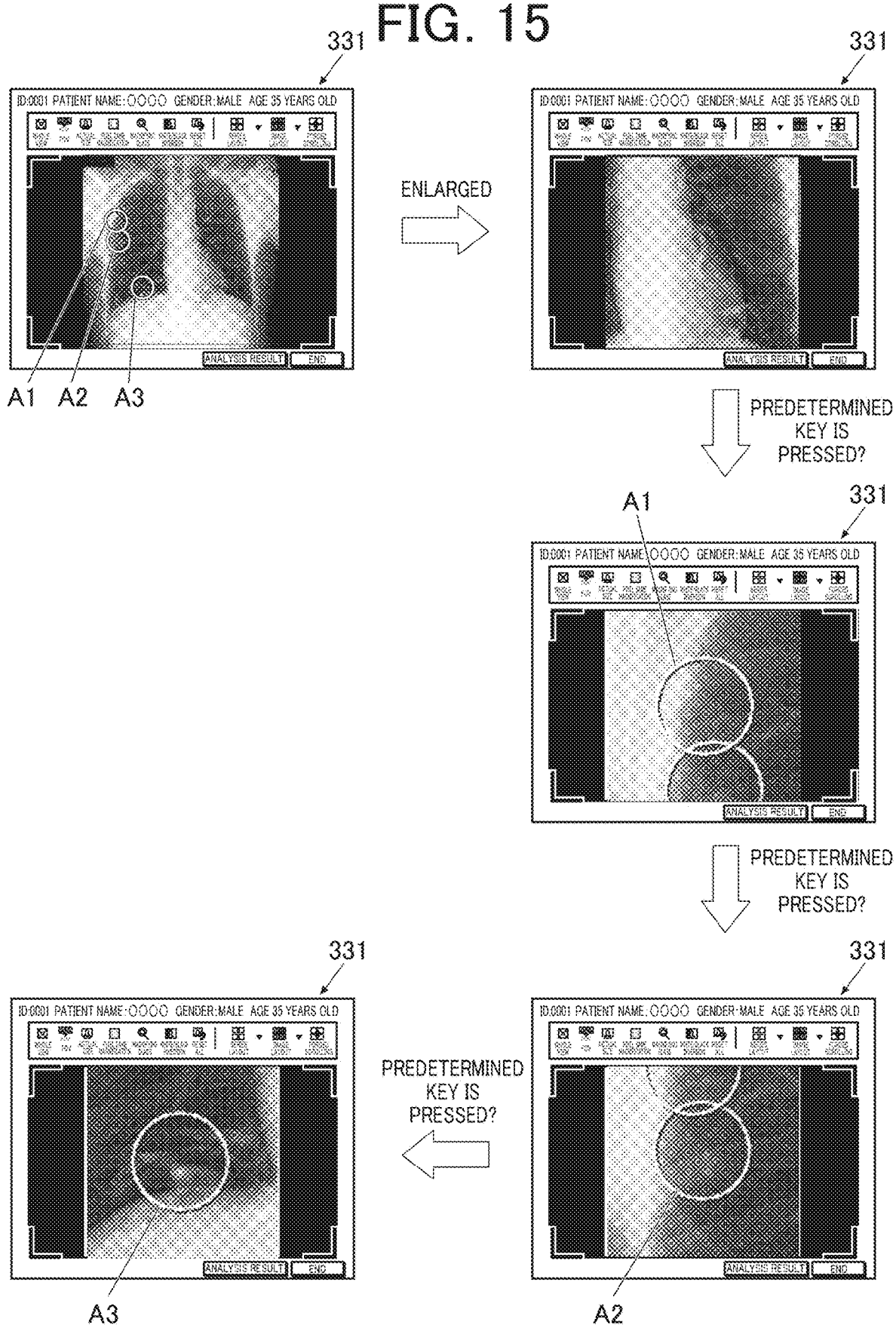
FIG. 15 is a diagram showing an example of a screen transition of the interpretation screen by the analysis result display processing B.

FIG. 15 illustrates an example of a screen transition of the interpreted image screen 331 in the analysis result display processing B. Note that FIG. 15 illustrates the example in which there are three lesion candidate areas that are not displayed in the image display area 331b after enlargement.

First, the entire medical image to be interpreted is displayed in the image display area 331b of the interpreted image screen 331, and when enlargement is instructed, the medical image to be interpreted is enlarged and displayed. In a case where the predetermined key is pressed by the operation part 32, the first lesion candidate area or the annotation A1 attached thereto among the lesion candidate areas or the annotations not displayed in the image display area 331b is displayed. Since the annotation is displayed while being attached to the lesion candidate area, both the first lesion candidate area and the annotation A1 are displayed. Next, when the predetermined key is pressed by the operation part 32, the second lesion candidate area or the annotation A2 attached thereto among the lesion candidate areas or the annotations not displayed in the image display area 331b is displayed. Further, when the predetermined key is pressed by the operation part 32, the third lesion candidate area or the annotation A3 attached thereto among the lesion candidate areas or the annotations not displayed in the image display area 331b is displayed.

As described above, one or more embodiments of the present invention appropriately generate and present medical image including the lesion candidate area, such that the lesion candidate area in the medical image or the annotation that is display information of the lesion candidate area do not fall out of the image display area of the screen, and thereby enable accurately performing an image analysis. Specifically, according to the analysis result display processing B, when a certain lesion candidate area (first lesion candidate area) or its annotation thereof (first display information) is not displayed in the image display area 331b, the lesion candidate area or the annotation can be displayed in the image display area 331b by performing the predetermined instruction input. Further, by repeating the predetermined instruction input, it is possible to switch from the display of the certain lesion candidate area (first lesion candidate area) or its annotation (first display information) to the display of another lesion candidate area (second lesion candidate area) or the annotation (second display information) which is not displayed.

Therefore, it is possible to prevent the user from overlooking the lesion to be viewed.

Although the first embodiment and the second embodiment of the present invention are described above, the contents described in the above embodiments are suitable examples of the recording medium, the display device, the display system, and the display method, and the present invention is not limited thereto.

For example, when all lesion candidate areas or annotations thereof are displayed in the flow of the analysis result display processing B, the enlargement of the medical image is automatically canceled. As another embodiment, instead of automatically canceling the enlargement, the processing for switching the lesion candidate areas or the annotations thereof to be displayed in order in accordance with the predetermined instruction input may be repeated, and when cancellation of the enlargement is instructed, the enlargement of the medical image may be canceled and the entire medical image may be displayed.

Further, when the controller 31 stores the lesion candidate area to be confirmed by the user in the storage section 35 or the RAM, and the user confirms the first lesion candidate area, the controller 31 may store confirmation information indicating that the first lesion candidate area is confirmed in the storage section 35 or the RAM. Then, in a case in which the confirmation information is stored, the controller 31 may exclude the first lesion candidate area from the lesion candidate areas to be confirmed by the user. That is, the lesion candidate area confirmed by the user may be excluded from the display target of the information indicating the presence of the lesion candidate area or the annotation that is not displayed in the first embodiment. Furthermore, the lesion candidate area that is confirmed by the user may be excluded from the display targets of the lesion candidate area or the annotation by the predetermined instruction input according to the second embodiment.

For example, when the annotation attached to the lesion candidate area displayed in the image display area 331b is specified by a right click or the like, the controller 31 displays a menu item including a "confirmed" item near the annotation. In a case in which the user clicks "confirmed" using the operation part 32, the controller 31 stores the confirmation information indicating that confirmation is performed in association with the information on the lesion candidate area corresponding to the designated annotation among the information on the lesion candidate area to be confirmed by the user. Alternatively, the lesion candidate area displayed in the image display area 331b after the enlargement of the medical image may be regarded as being confirmed by the user. That is, the controller 31 may store, among the information on the lesion candidate area to be confirmed by the user, the information on the lesion candidate area displayed in the image display area 331b after the enlargement of the medical image in association with the confirmation information. Then, the controller 31 excludes the lesion candidate area associated with the confirmation information from the lesion candidate area to be confirmed by the user. For example, the controller 31 excludes the lesion candidate area associated with the confirmation information from the display targets of the information indicating the presence of the lesion candidate area or the annotation that is not displayed according to the first embodiment. Further, the controller 31 excludes the lesion candidate area associated with the confirmation information from the display target of the lesion candidate area or the annotation according to the predetermined instruction input in the second embodiment.

Furthermore, when the end button 331f is pressed, the controller 31 transmits the information on the lesion candidate area associated with the confirmation information to the medical image management server 10, and causes the confirmation information to be stored in association with the information on the lesion candidate area in the analysis result in the analysis result storage area 144. Next, the controller 31 excludes, from the lesion candidate areas to be confirmed by the user, the lesion candidate areas associated with the confirmation information in the analysis result transmitted from the medical image management server 10. For example, the controller 31 excludes the lesion candidate area associated with the confirmation information from the display targets of the information indicating the presence of the lesion candidate area or the annotation that is not displayed according to the first embodiment. Further, the controller 31 excludes the lesion candidate area associated with the confirmation information from the display target of the lesion candidate area or the annotation according to the predetermined instruction input in the second embodiment.

In this way, since it is possible to indicate or display the presence of only an unconfirmed lesion candidate area among the lesion candidate areas to be confirmed by the user, it is possible to make the confirmation work of the lesion candidate area by the user efficient.

Figure 16:
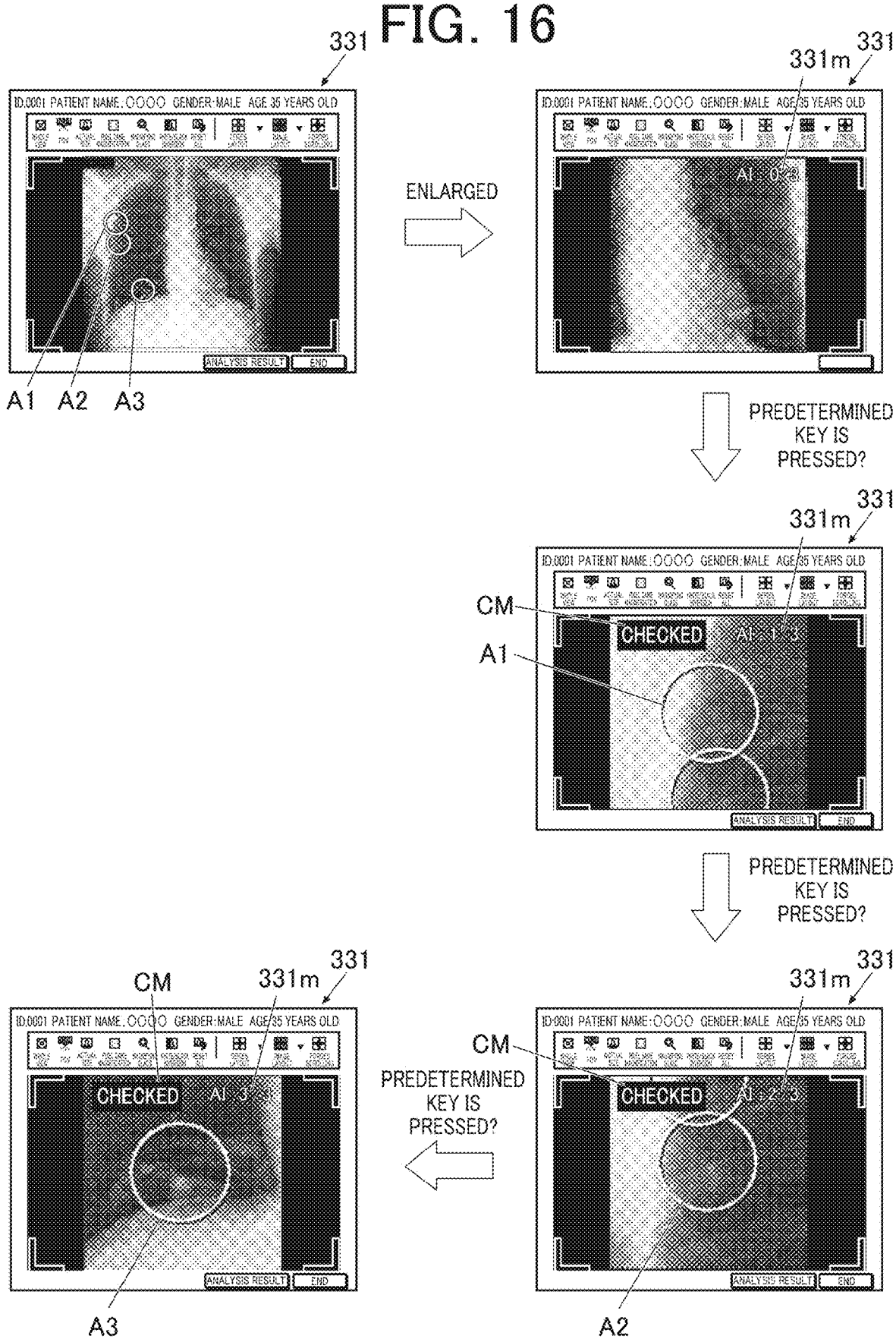
FIG. 16 is a diagram illustrating a modification of a screen transition of the image reading screen by the analysis result display processing B.

Furthermore, the controller 31 may display the lesion candidate area associated with the confirmation information together with the information indicating that the area is confirmed. For example, as illustrated in FIG. 16, the lesion candidate area associated with the confirmation information may be displayed together with a mark CM such as "checked" or "confirmed". Alternatively, the annotation of the lesion candidate area associated with the confirmation information may be displayed in a display manner (color, shape, or the like) different from that of the annotation of the unconfirmed lesion candidate area. Thus, since the user can easily distinguish between the already-confirmed lesion candidate area and the unconfirmed lesion candidate area, it is possible to make the confirmation work of the lesion candidate area by the user efficient.

In addition, information 331m indicating the total number of lesion candidate areas specified by computer processing on the medical image and the number of confirmed lesion candidate areas among the lesion candidate areas may be displayed on the display part 33. Accordingly, the user can easily grasp how many lesion candidate areas are checked among the lesion candidate areas to be checked.

The display of information indicating the presence of the lesion candidate area or the annotation that is not displayed in the first embodiment may be combined with the display of the lesion candidate area or the annotation in response to the predetermined instruction input in the second embodiment. For example, when there is the lesion candidate area or the annotation that is not displayed in the image display area 331b, the controller 31 displays information indicating the presence of the lesion candidate area or the annotation that is not displayed on the display part 33. Then, every time the predetermined instruction is entered, the controller 31 sequentially switches and displays the lesion candidate area or the annotation which is not displayed.

Furthermore, as the information indicating the presence of the lesion candidate area or the annotation that is not displayed according to the first embodiment, for example, a message such as "There is a detection result of AI outside the image display area. Please be careful not to overlook anything" or the like may be displayed.

In addition, the target candidate lesion area for displaying the information on the display part 33 indicating the presence of the candidate lesion area (or the annotation) that is not displayed is not limited to the area specified through computer processing. For example, the candidate lesion area specified through the interpretation of image by the radiologist may be used as the target candidate lesion area for displaying, on the display part 33, the information indicating the presence of the candidate lesion area (or the annotation) that is not displayed. That is, when the lesion candidate area that is not displayed in the image display area 331b or the display information thereof exists among the lesion candidate areas obtained by the interpretation of image by the radiologist, the controller 31 may display the information indicating that the lesion candidate area or the display information that is not displayed exists on the display part 33. Alternatively, the controller 31 may display the lesion candidate area or the display information, which is not displayed, on the display part 33 based on the instruction input of the processing.

In addition, in the first embodiment, the second embodiment, and the modifications thereof, cases are exemplified in which the controller 31 of the information processing apparatus 30 is the hardware processor. However, an apparatus other than the information processing apparatus 30 may include the hardware processor according to the embodiments of the present invention.

Furthermore, although the medical image management server 10 has the function of generating the analysis result by performing computer processing on the medical image in the above embodiments, a device other than the medical image management server 10 may have the analysis function.

In the above-described embodiments, although the example in which a chest image is used as the medical image is illustrated, the imaging part is not limited to the chest. Furthermore, the medical image to be processed may be a plurality of slice images obtained by CT or the like, a multi-frame image (moving image), or an image obtained by 3D-converting an image obtained by CT, MRI, or the like into a single image.

Further, the instructions for executing each process in each device may be stored in a portable recording medium. Furthermore, a carrier wave may be applied as a medium for providing data of the instructions via a communication line.

In addition, the detailed configuration and detailed operation of each device described in the above embodiments can be appropriately changed without departing from the scope of the present invention.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A non-transitory computer-readable recording medium storing instructions causing a computer to execute:
    acquiring first information indicating a first lesion candidate area in a medical image;
    a first display step of causing a display to display the medical image attached with first display information that is based on the first information; and
    a second display step of causing the display to display, in an image display area, presence information indicating that the first lesion candidate area or the first display information exists outside of the image display area, wherein
    the second display step is executed in a case where:
        the first lesion candidate area or the first display information exists outside of the image display area while an enlarged partial image of the medical image attached with the first display information is displayed within the image display area.

2. The recording medium according to claim 1, wherein the first lesion candidate area is specified by computer processing on the medical image.

3. The recording medium according to claim 1, wherein in a case that the first lesion candidate area or the first display information presents in the medical image but is out of the image display area,
    the display displays the first lesion candidate area or the first display information on the display in response to a predetermined instruction input.

4. The recording medium according to claim 1, wherein the presence information is obtained by at least one of:
    changing a frame of a window having the image display area;
    changing a background display area serving as a background of the image display area; and
    changing a tool display area of the window.

5. The recording medium according to claim 1, wherein the presence information is a mark indicating a direction in which the first lesion candidate area or the first display information is present.

6. The recording medium according to claim 1, wherein the presence information is obtained by changing an active frame indicating that the medical image is in use.

7. The recording medium according to claim 1, wherein the presence information is obtained by reducing the medical image attached with the first display information.

8. The recording medium according to claim 7, wherein the computer controls displaying of the enlarged partial image of the medical image in the image display area in response to an operation on a reduced image area in which the presence information obtained by reducing the medical image attached with the first display information is displayed.

9. The recording medium according to claim 1, wherein the presence information includes:
    a number of all lesion candidate areas included in the medical image; and
    any one of a number of the lesion candidate areas being displayed in the image display area and a number of the lesion candidate areas not being displayed in the image display area.

10. The recording medium according to claim 1, wherein the instructions cause the computer to execute: in response to an input identifying at least one of lesion candidate areas or annotations, changing the enlarged partial image displayed within the image display area such that the at least one of the lesion candidate areas or the annotations are displayed within the image display area.

11. A display device comprising:
    a hardware processor that:
        acquires first information indicating a first lesion candidate area in a medical image,
        executes a first display step of causing a display to display the medical image attached with first display information that is based on the first information, and
        executes a second display step of causing the display to display, in an image display area, presence information indicating that the first lesion candidate area or the first display information exists outside of the image display area, wherein
    the second display step is executed in a case where:
        the first lesion candidate area or the first display information exists outside of the image display area while an enlarged partial image of the medical image attached with the first display information is displayed within the image display area.

12. The display device according to claim 11, wherein the first lesion candidate area is specified by computer processing on the medical image.

13. The display device according to claim 11, wherein in a case that the first lesion candidate area or the first display information presents in the medical image but is out of the image display area,
    the hardware processor causes the display to display the first lesion candidate area or the first display information in response to a predetermined instruction input.

14. The display device according to claim 11, wherein the presence information is obtained by at least one of:
    changing a frame of a window having the image display area;
    changing a background display area serving as a background of the image display area; and
    changing a tool display area of the window.

15. The display device according to claim 11, wherein the presence information is a mark indicating a direction in which the first lesion candidate area or the first display information is present.

16. The display device according to claim 11, wherein the presence information is obtained by reducing the medical image attached with the first display information.

17. The display device according to claim 16, wherein the hardware processor controls displaying of the enlarged partial image an enlarged display of the medical image in the image display area in response to an operation on a reduced image area in which the presence information obtained by reducing the medical image attached with the first display information is displayed.

18. The display device according to claim 11, wherein the presence information includes:
- a number of all lesion candidate areas included in the medical image, and
- any one of a number of the lesion candidate areas being displayed in the image display area and a number of the lesion candidate areas not being displayed in the image display area.

19. A display system comprising:
a hardware processor that:
- acquires first information indicating a first lesion candidate area in a medical image,
- executes a first display step of causing a display to display the medical image attached with first display information that is based on the first information, and
- executes a second display step of causing the display to display, in an image display area, presence information indicating that the first lesion candidate area or the first display information exists outside of the image display area, wherein the second display step is executed in a case where:
- the first lesion candidate area or the first display information exists outside of the image display area while an enlarged partial image of the medical image attached with the first display information is displayed within the image display area.

20. A display method comprising:
acquiring first information indicating a first lesion candidate area in a medical image;
a first display step of displaying, on a display, the medical image attached with first display information that is based on the first information; and
a second display step of displaying, in an image display area on the display, presence information indicating that the first lesion candidate area or the first display information exists outside of the image display area, wherein the second display step is executed in a case where:
the first lesion candidate area or the first display information exists outside of the image display area while an enlarged partial image of the medical image attached with the first display information is displayed within the image display area.

\* \* \* \* \*